United States Patent
Yang et al.

(10) Patent No.: US 8,698,474 B2
(45) Date of Patent: Apr. 15, 2014

(54) START-UP CIRCUIT WITH LOW STANDBY POWER LOSS FOR POWER CONVERTERS

(75) Inventors: Ta-Yung Yang, Milpitas, CA (US); Wei-Hsuan Huang, Taoyuan County (TW); Rui-Hong Lu, Chiayi County (TW)

(73) Assignee: System General Corp., Taipei Hsien (TW)

( * ) Notice: Subject to any disclaimer, the term of this patent is extended or adjusted under 35 U.S.C. 154(b) by 220 days.

(21) Appl. No.: 13/095,074

(22) Filed: Apr. 27, 2011

(65) Prior Publication Data

US 2011/0305051 A1    Dec. 15, 2011

Related U.S. Application Data

(60) Provisional application No. 61/353,786, filed on Jun. 11, 2010.

(51) Int. Cl.
*G05F 1/00* (2006.01)
*H02M 1/00* (2007.01)

(52) U.S. Cl.
USPC ............................................ 323/287; 363/49

(58) Field of Classification Search
USPC ............................ 323/287, 300, 901; 363/49, 363/56.01–56.11
See application file for complete search history.

(56) References Cited

U.S. PATENT DOCUMENTS

| | | | | |
|---|---|---|---|---|
| 4,156,273 A | * | 5/1979 | Sato | 363/21.16 |
| 5,995,384 A | * | 11/1999 | Majid et al. | 363/21.18 |
| 6,462,437 B1 | * | 10/2002 | Marmaropoulos et al. | 307/125 |
| 6,906,934 B2 | * | 6/2005 | Yang et al. | 363/49 |
| 7,257,008 B2 | | 8/2007 | Yang et al. | |
| 7,443,702 B2 | | 10/2008 | Yang et al. | |
| 7,529,105 B1 | * | 5/2009 | Choi et al. | 363/21.12 |
| 2007/0247879 A1 | * | 10/2007 | Yang | 363/49 |

* cited by examiner

*Primary Examiner* — Adolf Berhane
*Assistant Examiner* — Gary Nash
(74) *Attorney, Agent, or Firm* — Rosenberg, Klein & Lee

(57) ABSTRACT

A start-up circuit with low standby power loss for power converters according to present invention comprises a first diode and a second diode coupled to an input voltage of the power converter. A start-up resistor is coupled to the join of the first diode and the second diode. A high-voltage switch is coupled to the start-up resistor to generate a power source. A control circuit generates a switching signal for switching a transformer. A detection circuit generates a disable signal in response to the input voltage to disable the switching signal. A winding of the transformer is coupled to the power source to generate the power for the power source. The high-voltage switch is turned off to cut off the start-up resistor for saving the power loss once the voltage of the power source is higher than a threshold.

17 Claims, 3 Drawing Sheets

US 8,698,474 B2

START-UP CIRCUIT WITH LOW STANDBY POWER LOSS FOR POWER CONVERTERS

REFERENCE TO RELATED APPLICATIONS

This Application is based on Provisional Patent Application Ser. No. 61/353,786, filed 11 Jun. 2010, currently pending.

BACKGROUND OF THE INVENTION

1. Field of Invention

The present invention relates in general to a control circuit of power converter, and more particularly, to a start-up circuit and method for offline power converter.

2. Description of Related Art

The present invention is a start-up circuit with low standby power loss for power converters. A prior art of "Integrated start-up circuit with reduced power consumption" U.S. Pat. No. 6,906,934 that had been disclosed using the bleeding resistor of the EMI filter to start the power converter for the power saving. However, the bleeding resistor still causes a power loss that can be further reduced, particular for the light-load and no-load conditions. The objective of this invention is to use a start-up resistor to start the power converter, and the start-up resistor will be cut off to save the power loss after the start-up operation. Once the AC input power is removed, the start-up resistor will be switched on and coupled to discharge the EMI filter for the safety.

SUMMARY OF THE INVENTION

It is an objective of the present invention to provide a start-up circuit for power converter. It can start the power converter by using a start-up resistor, and the start-up resistor will be cut off after the start-up operation for reducing the power loss.

The present invention is a start-up circuit with low standby power loss for power converters. The start-up circuit according to the present invention comprises a first diode, a second diode, a start-up resistor, a high-voltage switch, a control circuit and a detection circuit. The first diode and the second diode are coupled to an input voltage of the power converter, and the second diode is further coupled to the first diode. The start-up resistor is coupled to the join of the first diode and the second diode. The high-voltage switch is coupled to the start-up resistor to generate a power source. The control circuit generates a switching signal for switching a transformer. The detection circuit generates a disable signal in response to the input voltage of the power converter. A winding of the transformer is further coupled to the power source to generate the power for the power source. The high-voltage switch is turned off once the voltage of the power source is higher than a threshold. The high-voltage switch is turned on once the voltage of the power source is lower than the threshold. The switching signal is disabled in response to the disable signal. The start-up resistor will be cut off by the high-voltage switch after the start-up operation for reducing the power loss.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 shows the circuit diagram of a preferred embodiment of an offline power converter with a start-up circuit according to present invention.

DETAILED DESCRIPTION OF PREFERRED EMBODIMENTS

Figure 1:
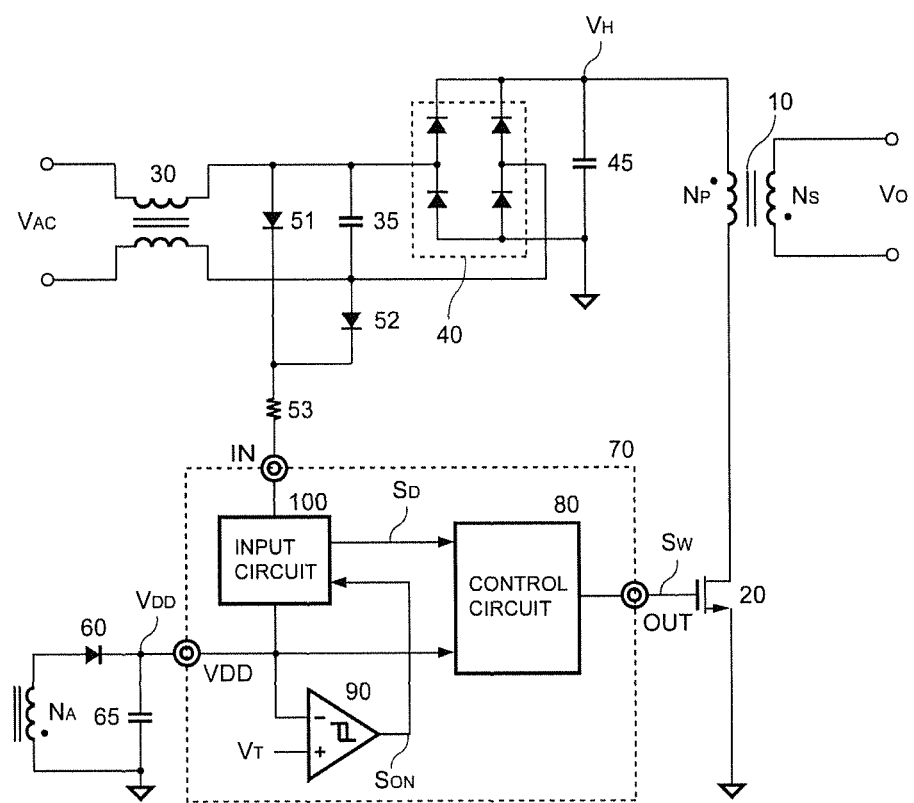

FIG. 1 is the circuit diagram of a preferred embodiment of an offline power converter with a start-up circuit according to present invention. An EMI filter is coupled to an input voltage $V_{AC}$ of the power converter. The EMI filter is developed by a common-mode choke 30 and a capacitor 35. The capacitor 35 is coupled to the common-mode choke 30. A bridge rectifier 40 coupled to the EMI filter receives the input voltage $V_{AC}$ for producing a DC voltage $V_H$ at a bulk capacitor 45. The bulk capacitor 45 is connected to a transformer 10. The transformer 10 includes a primary winding $N_P$, a secondary winding $N_S$ and an auxiliary winding $N_A$. A first diode 51 and a second diode 52 are coupled from the common-mode choke 30 of the EMI filter to a start-up resistor 53. The first diode 51 and the second diode 52 are coupled to the input voltage $V_{AC}$ through the common-mode choke 30. The start-up resistor 53 is further coupled from a join of the first diode 51 and the second diode 52 to an input terminal IN of a controller 70. The controller 70 has an input circuit 100, a hysteresis comparator 90 and a control circuit 80.

The input circuit 100 is coupled to the start-up resistor 53 through the input terminal IN of the controller 70. The input circuit 100 is utilized to generate a power source $V_{DD}$ in response to the input voltage $V_{AC}$ for supplying the power source $V_{DD}$ to the controller 70. Therefore, the power source $V_{DD}$ is correlated to the input voltage $V_{AC}$. A store capacitor 65 receiving the power source $V_{DD}$ is connected to a supply terminal VDD of the controller 70 to store the energy of the power source $V_{DD}$. The store capacitor 65 is further coupled to the auxiliary winding $N_A$ in parallel. The control circuit 80 is coupled to the input circuit 100 for generating a switching signal $S_W$ at an output terminal OUT of the controller 70 to drive a power transistor 20. The power transistor 20 is coupled between the primary winding $N_P$ of the transformer 10 and the ground. The control circuit 80 receives a disable signal $S_D$ and the power source $V_{DD}$. The disable signal $S_D$ is to disable the switching signal $S_W$. The power transistor 20 is coupled to switch the transformer 10 for regulating an output voltage $V_O$ at the output of the power converter. When the transformer 10 is switched to generate the output voltage $V_O$ via the secondary winding $N_S$, the auxiliary winding $N_A$ will generate the power coupled to supply the power source $V_{DD}$ through a diode 60 coupled between the auxiliary winding $N_A$ and the store capacitor 65.

A hysteresis comparator 90 with a hysteresis threshold $V_T$ is coupled to detect the voltage level of the power source $V_{DD}$ and generate a control signal $S_{ON}$. The hysteresis threshold $V_T$ includes a hysteresis range. A negative input of the hysteresis comparator 90 receives the power source $V_{DD}$ via the supply terminal VDD of the controller 70. A positive input of the hysteresis comparator 90 receives the hysteresis threshold $V_T$ with a low-threshold $V_{T1}$ and a high-threshold $V_{T2}$. Through the hysteresis comparator 90, the control signal $S_{ON}$ will be generated by comparing the power source $V_{DD}$ with the hysteresis threshold $V_T$. The low-threshold $V_{T1}$ is a lower-limit value of the hysteresis threshold $V_T$ and the high-threshold $V_{T2}$ is an upper-limit value of the hysteresis threshold $V_T$. The control signal $S_{ON}$ is utilized to turn off the input circuit 100 once the voltage level of the power source $V_{DD}$ is higher than the high-threshold $V_{T2}$. On the contrary, the control signal $S_{ON}$ is utilized to turn on the input circuit 100 once the voltage level of the power source $V_{DD}$ is lower than the low-threshold $V_{T1}$. According to above description, the control signal $S_{ON}$ is generated to control the input circuit 100 in response to the input voltage $V_{AC}$ of the power converter and the hysteresis threshold $V_T$.

Figure 3:
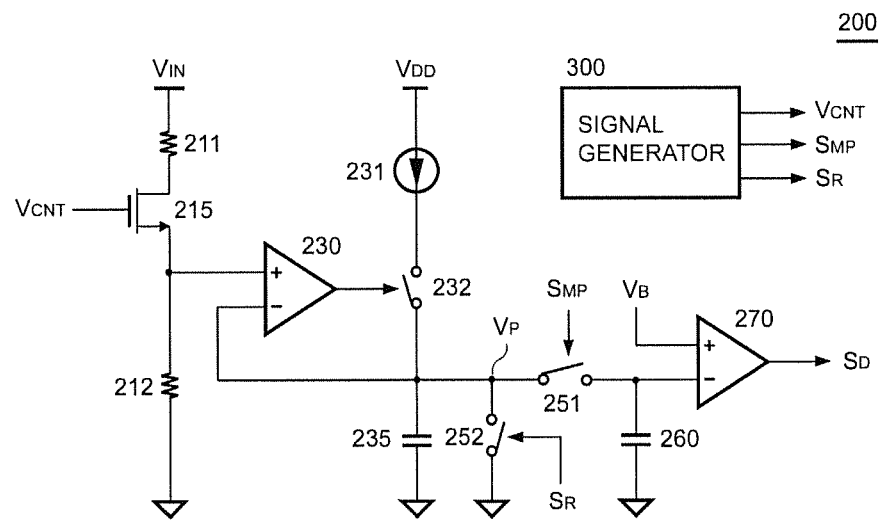
FIG. 3 is the circuit diagram of a preferred embodiment of the detection circuit according to present invention.

When the input voltage $V_{AC}$ is applied to the power converter and the input circuit 100 is turned on, the power source $V_{DD}$ is generated through the start-up resistor 53. Once the power source $V_{DD}$ is higher than the high-threshold $V_{T2}$, the input circuit 100 is turned off and the start-up resistor 53 is cut off for power saving. At this moment, the power source $V_{DD}$ is further supplied by the auxiliary winding $N_A$ of the transformer 10. If the input voltage $V_{AC}$ is removed and the voltage level of the input voltage $V_{AC}$ is lower than a low-voltage threshold $V_B$ (as shown in FIG. 3), the input circuit 100 will generate the disable signal $S_D$ to disable the switching signal $S_W$. Once the switching signal $S_W$ is disabled, the auxiliary winding $N_A$ will not deliver the power to supply the power source $V_{DD}$. The voltage level of the power source $V_{DD}$ will be lower than the low-threshold $V_{T1}$. The hysteresis comparator 90 will generate the control signal $S_{ON}$ to turn on the input circuit 100. The start-up resistor 53 will be coupled to the supply terminal VDD generating the power source $V_{DD}$ and the control circuit 80. Thus, the capacitor 35 of the EMI filter will be discharged through the diodes 51 or 52, the start-up resistor 53, the input circuit 100, the power source $V_{DD}$, the supply terminal VDD and the bridge rectifier 40.

Figure 2:
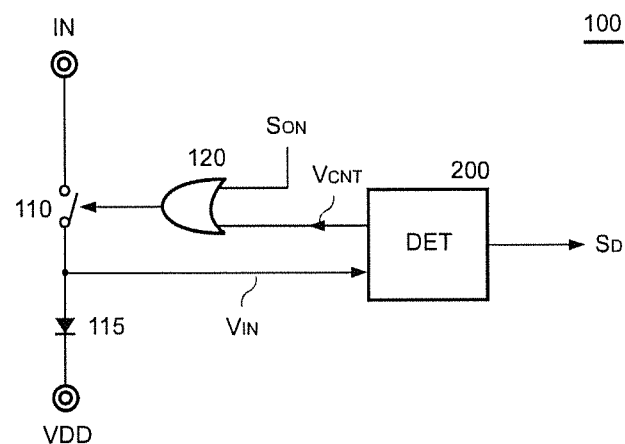
FIG. 2 is the circuit diagram of a preferred embodiment of the input circuit according to present invention.

FIG. 2 is a preferred embodiment of the input circuit 100 according to present invention. The input circuit 100 includes a high-voltage switch 110, a diode 115, an OR gate 120 and a detection circuit (DET) 200. The high-voltage switch 110 is coupled from the input terminal IN of the controller 70 (as shown in FIG. 1) to the supply terminal VDD of the controller 70 through the diode 115 for generating the power source $V_{DD}$. The detail operation of the high-voltage switch 110 can be found in the prior art of "Start-up apparatus for power converters", U.S. Pat. No. 7,257,008; and "High voltage start up circuit for power converters", U.S. Pat. No. 7,443,702. An output terminal of the OR gate 120 is coupled to control the on/off of the high-voltage switch 110 in response to the control signal $S_{ON}$ and a cont-voltage $V_{CNT}$ received by input terminals of the OR gate 120. Therefore, the high-voltage switch 110 is controlled in response to the control signal $S_{ON}$ and the cont-voltage $V_{CNT}$. On the other hand, the high-voltage switch 110 is turned on as long as the control signal $S_{ON}$ or the cont-voltage $V_{CNT}$ is a high-level. Thus, the high-voltage switch 110 is turned on once the voltage level of the power source $V_{DD}$ (as shown in FIG. 1) is lower than low-threshold $V_{T1}$.

The detection circuit 200 is coupled to receive a source voltage $V_{IN}$ from the high-voltage switch 110 and the diode 115 for detecting the input voltage $V_{AC}$ (as shown in FIG. 1) of the power converter. The detection circuit 200 generates the cont-voltage $V_{CNT}$ and the disable signal $S_D$ in response to the source voltage $V_{IN}$. The source voltage $V_{IN}$ is correlated to the input voltage $V_{AC}$, and therefore the detection circuit 200 generates the disable signal $S_D$ in response to the input voltage $V_{AC}$. The cont-voltage $V_{CNT}$ is a logic-high level periodically, and therefore the high-voltage switch 110 is turned on periodically for detecting the input voltage $V_{AC}$ of the power converter.

FIG. 3 is a preferred embodiment of the detection circuit 200 according to present invention. A resistor 211, a clamp transistor 215 and a resistor 212 are connected in series. The resistor 211 is coupled to the high-voltage switch 110 to receive the source voltage $V_{IN}$ connected to the clamp transistor 215. A drain terminal of the clamp transistor 215 is coupled to the resistor 211. The resistor 212 is connected from a source terminal of the clamp transistor 215 to the ground. A gate terminal of the clamp transistor 215 is controlled by the cont-voltage $V_{CNT}$. Once the clamp transistor 215 is turned on, the resistors 211 and 212 form a voltage divider coupled to the high-voltage switch 110 (as shown in FIG. 2) for attenuating the source voltage $V_{IN}$. The maximum voltage developed at the resistor 212 is clamped by the cont-voltage $V_{CNT}$. The voltage generated at the resistor 212 is a level-shift voltage and coupled to a peak detector. The voltage divider generates the level-shift voltage in response to the input voltage $V_{AC}$ due to the source voltage $V_{IN}$ is correlated to the input voltage $V_{AC}$. The voltage divider further comprises the clamp transistor 215 to enable/disable the voltage divider.

An operational amplifier 230, a current source 231, a switch 232 and a peak capacitor 235 develop the peak detector for generating a peak signal $V_P$ in accordance with the voltage generated at the resistor 212. A positive input of the operational amplifier 230 is coupled to the source terminal of the clamp transistor 215 and the resistor 212. A negative input of the operational amplifier 230 is connected to the switch 232 and the peak capacitor 235. The switch 232 is controlled by an output of the operational amplifier 230. The current source 231 is connected between the power source $V_{DD}$ and the switch 232. The peak capacitor 235 is coupled between the switch 232 and the ground.

The peak signal $V_P$ generated at the peak capacitor 235 is sampled to a hold capacitor 260 via a sample switch 251. The sample switch 251 is coupled between the peak capacitor 235 and the hold capacitor 260. The hold capacitor 260 is further coupled to the ground. A clear switch 252 is coupled to discharge the peak signal $V_P$ generated at the peak capacitor 235 of the peak detector periodically. The clear switch 252 is coupled between the peak capacitor 235 and the ground. The voltage of the hold capacitor 260 is coupled to a comparator 270 to compare with the low-voltage threshold $V_B$.

A negative input and a positive input of the comparator 270 are coupled to receive the voltage of the hold capacitor 260 and the low-voltage threshold $V_B$ respectively. The disable signal $S_D$ is generated by comparing the voltage of the hold capacitor 260 with the low-voltage threshold $V_B$. Therefore, the comparator 270 generates the disable signal $S_D$ in response to the peak signal $V_P$ and the low-voltage threshold $V_B$. If the voltage of the hold capacitor 260 is lower than the low-voltage threshold $V_B$, the comparator 270 will generate the disable signal $S_D$ to disable the switching signal $S_W$. On the other hand, the input circuit 100 will generate the disable signal $S_D$ to disable the switching signal $S_W$ once the voltage level of the input voltage $V_{AC}$ (as shown in FIG. 1) is lower than the low-voltage threshold $V_B$.

The low-voltage threshold $V_B$ is a limited value for brown-out protection. A signal generator 300 is utilized to generate the cont-voltage $V_{CNT}$, a sample signal $S_{MP}$ and a clear signal $S_R$. The sample signal $S_{MP}$ and the clear signal $S_R$ are coupled to control the sample switch 251 and the clear switch 252 respectively. The clear signal $S_R$ controls the clear switch 252 to reset the peak signal $V_P$ periodically. The input circuit 100 will generate the disable signal $S_D$ coupled to disable the switching signal $S_W$ once the voltage level of the input voltage $V_{AC}$ is lower than the low-voltage threshold $V_B$, such as a brownout level.

Figure 4:
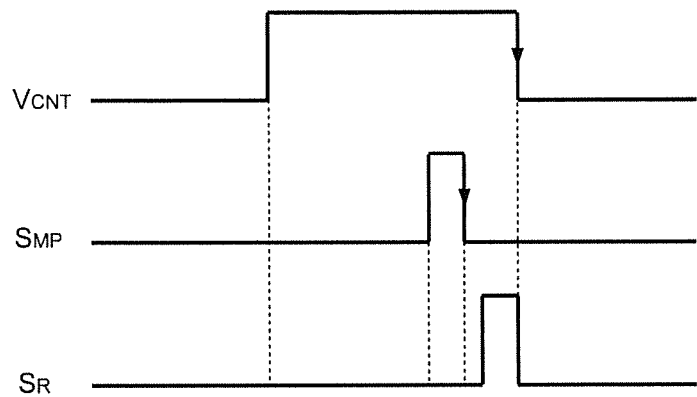
FIG. 4 shows the waveforms of the cont-voltage, the sample signal and the clear signal according to present invention.

FIG. 4 shows the waveforms of the cont-voltage $V_{CNT}$, the sample signal $S_{MP}$ and the clear signal $S_R$ according to present invention. The cont-voltage $V_{CNT}$ controls the clamp transistor 215 (as shown in FIG. 3). The sample signal $S_{MP}$ is coupled to control the sample switch 251 (as shown in FIG. 3). A period of the sample signal $S_{MP}$ is smaller than a period of the cont-voltage $V_{CNT}$. The clear signal $S_R$ is coupled to discharge the peak capacitor 235 (as shown in FIG. 3) of the peak detector. The duration of the clear signal $S_R$ is between a falling edge of the sample signal $S_{MP}$ and a falling edge of the cont-voltage $V_{CNT}$. Therefore, the clear signal $S_R$ is generated periodically and its frequency is lower than the line frequency of the input voltage $V_{AC}$ (as shown in FIG. 1). The peak signal $V_P$ of the peak detector is periodically reset by the clear signal $S_R$.

Figure 5:
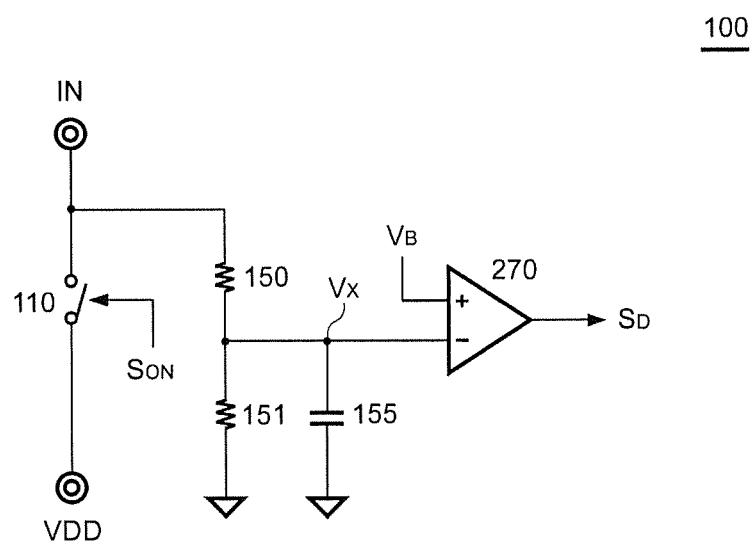
FIG. 5 is the circuit diagram of another preferred embodiment of the input circuit according to present invention.

FIG. 5 is the circuit diagram of another preferred embodiment of the input circuit 100 according to present invention. The input circuit 100 includes the high-voltage switch 110, resistors 150 and 151, a filter capacitor 155 and a comparator 270. The resistors 150 and 151, the filter capacitor 155 and the comparator 270 serve as the detection circuit for detecting the input voltage $V_{AC}$ (as shown in FIG. 1) of the power converter. The high-voltage switch 110 is coupled from the input terminal IN of the controller 70 (as shown in FIG. 1) to the supply terminal VDD of the controller 70. The high-voltage switch 110 of this embodiment is only controlled by the control signal $S_{ON}$. The resistors 150 and 151 is coupled each other in series to form a voltage divider. The voltage divider is coupled between the input terminal IN and the ground. The voltage divider is further coupled to the high-voltage switch 110 and the start-up resistor 53 (as shown in FIG. 1).

The filter capacitor 155 is coupled to a join of the resistors 150 and 151 for developing a low-pass filter. The filter capacitor 155 is further coupled to the ground. The filter capacitor 155 generates a filter signal $V_X$ by the low-pass filter in response to the input voltage $V_{AC}$ of the power converter. The filter signal $V_X$ is correlated to the input voltage $V_{AC}$. The negative input and the positive input of the comparator 270 are coupled to receive the filter signal $V_X$ and the low-voltage threshold $V_B$ respectively. The disable signal $S_D$ is generated by comparing the filter signal $V_X$ with the low-voltage threshold $V_B$. If the filter signal $V_X$ is lower than the low-voltage threshold $V_B$, the comparator 270 will generate the disable signal $S_D$ to disable the switching signal $S_W$. The low-voltage threshold $V_B$ serves as a limited value for brownout protection.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A start-up circuit for a power converter, comprising:
   a first diode coupled to an input voltage of the power converter;
   a second diode coupled to the input voltage of the power converter and the first diode;
   a start-up resistor coupled to the join of the first diode and the second diode;
   a high-voltage switch coupled to the start-up resistor and utilized to generate a power source;
   a control circuit generating a switching signal for switching a transformer; and
   a detection circuit coupled to the high-voltage switch to generate a disable signal in response to the input voltage of the power converter;
   wherein a power supply of the control circuit is supplied by the power source, a winding of the transformer is further coupled to the power source to generate a power for the power source; the high-voltage switch is turned off and stopped generating the power source once the voltage of the power source is higher than a threshold; the high-voltage switch is turned on once the voltage of the power source is lower than the threshold; the switching signal is disabled in response to the disable signal.

2. The start-up circuit as claimed in claim 1, wherein the disable signal is generated once the input voltage of the power converter is lower than a limited value.

3. The start-up circuit as claimed in claim 1, wherein the high-voltage switch is further turned on periodically for detecting the input voltage of the power converter.

4. The start-up circuit as claimed in claim 1, wherein the high-voltage switch is coupled to the power source via a diode.

5. The start-up circuit as claimed in claim 1, wherein the detection circuit comprises:
   a voltage divider coupled to the high-voltage switch for generating a level-shift voltage in response to the input voltage of the power converter;
   a peak detector coupled to the voltage divider for generating a peak signal in accordance with the level-shift voltage; and
   a comparator generating the disable signal in response to the peak signal and a limited value;
   wherein the voltage divider further comprises a clamp transistor to enable/disable the voltage divider, and the peak signal of the peak detector is periodically reset by a clear signal.

6. The start-up circuit as claimed in claim 5, wherein the frequency of the clear signal is lower than the frequency of the input voltage of the power converter.

7. The start-up circuit as claimed in claim 1, wherein the detection circuit comprises:
   a voltage divider coupled to the start-up resistor;
   a filter capacitor coupled to the voltage divider to generate a filter signal in response to the input voltage; and
   a comparator generating the disable signal in response to the filter signal and a limited value.

8. The start-up circuit as claimed in claim 1, wherein the winding of the transformer will not generate the power for the power source and the power source is reduced when the switching signal is disabled; once the voltage of the power source is lower than the threshold, the high-voltage switch is turned on and a EMI filter of the power converter will be discharged through the first diode or the second diode and the start-up resistor and a bridge rectifier.

9. A start-up circuit, comprising:
   a first diode coupled to an input voltage of a power converter;
   a second diode coupled to the input voltage of the power converter and the first diode;
   a start-up resistor coupled to the join of the first diode and the second diode;
   a high-voltage switch coupled to the start-up resistor and utilized to generate a power source;

a control circuit generating a switching signal for switching a transformer; and a detection circuit generating a disable signal in response to the input voltage of the power converter;

wherein a power supply of the control circuit is supplied by the power source; a winding of the transformer is further coupled to the power source to generate a power for the power source; the high-voltage switch is turned off and stopped generating the power source once the voltage of the power source is higher than a threshold; the high-voltage switch is turned on once the voltage of the power source is lower than the threshold; the switching signal is disabled in response to the disable signal.

10. The start-up circuit as claimed in claim 9, wherein the disable signal is generated once the input voltage of the power converter is lower than a limited value.

11. The start-up circuit as claimed in claim 9, wherein the threshold includes a hysteresis range.

12. The start-up circuit as claimed in claim 9, wherein the detection circuit comprises:

a voltage divider coupled to the start-up resistor;

a filter capacitor coupled to the voltage divider to generate a filter signal in response to the input voltage; and a comparator generating the disable signal in response to the filter signal and a limited value.

13. The start-up circuit as claimed in claim 9, wherein the detection circuit comprises:

a voltage divider coupled to the high-voltage switch for generating a level-shift voltage in response to the input voltage of the power converter;

a peak detector coupled to the voltage divider for generating a peak signal in accordance with the level-shift voltage; and a comparator generating the disable signal in response to the peak signal and a limited value;

wherein the voltage divider further comprises a clamp transistor to enable/disable the voltage divider, and the peak signal of the peak detector is periodically reset by a clear signal, the frequency of the clear signal is lower than the frequency of the input voltage of the power converter.

14. The start-up circuit as claimed in claim 9, wherein the winding of the transformer will not generate the power for the power source and the power source is reduced when the switching signal is disabled; once the voltage of the power source is lower than the threshold, the high-voltage switch is turned on and a EMI filter of the power converter will be discharged through the first diode or the second diode and the start-up resistor and a bridge rectifier.

15. A method for providing start-up with low standby power loss, comprising:

generating a switching signal for switching a transformer;

generating a power source through a high-voltage switch and a diode for generating the switching signal; and generating a control signal in response to an input voltage;

wherein a winding of the transformer is further coupled to the power source to generate a power for the power source; the control signal is further coupled to control the on/off of the high-voltage switch.

16. The method for providing start-up as claimed in claim 15, wherein the control signal is generated once the input voltage of a power converter reaches a threshold.

17. The method for providing start-up as claimed in claim 16, wherein the threshold includes a hysteresis range.

* * * * *